(12) United States Patent
Lee et al.

(10) Patent No.: US 12,467,716 B2
(45) Date of Patent: Nov. 11, 2025

(54) DUAL DETENT APPARATUS FOR ROCKET

(71) Applicant: AGENCY FOR DEFENSE DEVELOPMENT, Daejeon (KR)

(72) Inventors: Junho Lee, Daejeon (KR); Minji Bae, Daejeon (KR); Youngil Kim, Daejeon (KR); Sora Jeong, Daejeon (KR)

(73) Assignee: AGENCY FOR DEFENSE DEVELOPMENT, Daejon (KR)

( * ) Notice: Subject to any disclaimer, the term of this patent is extended or adjusted under 35 U.S.C. 154(b) by 119 days.

(21) Appl. No.: 18/514,686

(22) Filed: Nov. 20, 2023

(65) Prior Publication Data
US 2025/0051009 A1 Feb. 13, 2025

(30) Foreign Application Priority Data
Aug. 7, 2023 (KR) .......................... 10-2023-0102666

(51) Int. Cl.
*F41F 3/052* (2006.01)
*B64D 7/08* (2006.01)
(52) U.S. Cl.
CPC ................ *F41F 3/052* (2013.01); *B64D 7/08* (2013.01)
(58) Field of Classification Search
CPC ............ F41B 3/052; F42B 15/36; B64D 1/06
See application file for complete search history.

(56) References Cited

U.S. PATENT DOCUMENTS

| | | | | | |
|---|---|---|---|---|---|
| 1,504,718 | A | * | 8/1924 | Russell | B64D 1/04 89/1.51 |
| 1,508,192 | A | * | 9/1924 | Lesh | B64D 1/04 89/1.51 |
| 1,725,473 | A | * | 8/1929 | Page | B64D 1/04 294/82.26 |
| 2,341,456 | A | * | 2/1944 | Markey | B64D 1/04 89/1.51 |
| 2,409,575 | A | * | 10/1946 | Markey | B64D 1/04 89/1.51 |
| 2,435,639 | A | * | 2/1948 | Stockton | B64D 1/04 89/1.51 |

(Continued)

FOREIGN PATENT DOCUMENTS

| KR | 2000-0038687 A | 7/2000 |
|---|---|---|
| KR | 10-1853264 B1 | 4/2018 |
| KR | 10-1995518 B1 | 7/2019 |

Primary Examiner — Derrick R Morgan
(74) Attorney, Agent, or Firm — Heslin Rothenberg Farley & Mesiti P.C.

(57) ABSTRACT

Provided is a detent apparatus for a rocket, The detent apparatus includes a detent including a first end portion, a second end portion opposite to the first end portion, an extension extending between the first end portion and the second end portion, and a detent protrusion configured to engage with the rocket, a first elastic body configured to elastically support the first end portion of the detent and connected to the first end portion, and an electrical safety device configured to prevent rotation of the detent including a hinge fixing frame having a hinge axis parallel to the detent rotation axis, a detent support configured to rotate around the hinge axis and support the detent, a hinge axis shaft arranged on the hinge axis, a solenoid configured to rotate the detent support by pushing the detent support, and a micro switch activated when the detent support rotates.

20 Claims, 5 Drawing Sheets

(56) References Cited

U.S. PATENT DOCUMENTS

| | | | | |
|---|---|---|---|---|
| 2,466,980 A | * | 4/1949 | Bronson | B64D 1/04 294/82.26 |
| 2,502,416 A | * | 4/1950 | Brown | B64D 1/06 258/1.2 |
| 2,623,437 A | * | 12/1952 | Foster | B64D 1/04 89/1.51 |
| 2,789,468 A | * | 4/1957 | Burns | B64D 1/04 294/82.26 |
| 2,832,632 A | * | 4/1958 | Johnson | B64D 1/06 294/82.26 |
| 2,930,288 A | * | 3/1960 | Jonah | F42B 5/035 89/1.817 |
| 2,941,448 A | * | 6/1960 | Brandt | F41A 17/76 89/1.813 |
| 3,040,629 A | * | 6/1962 | Duncan | F41F 3/052 89/1.819 |
| 3,266,834 A | * | 8/1966 | Lebovitz | B64D 1/06 294/82.26 |
| 3,494,248 A | * | 2/1970 | Wenger | B64D 1/02 294/82.26 |
| 3,503,576 A | * | 3/1970 | Savarieau | B64D 1/06 74/2 |
| 3,598,341 A | * | 8/1971 | La Roe | B64D 1/06 244/137.4 |
| 3,677,506 A | * | 7/1972 | La Roe | B64D 1/06 294/82.26 |
| 3,751,949 A | * | 8/1973 | Castle | E05C 1/14 70/144 |
| 3,766,828 A | * | 10/1973 | Cords | B64D 7/00 89/1.816 |
| 3,842,711 A | * | 10/1974 | Bodinaux | F41F 3/04 89/1.807 |
| 3,854,680 A | * | 12/1974 | Hasquenoph | B64D 1/06 244/137.4 |
| 3,854,681 A | * | 12/1974 | Hasquenoph | B64D 1/06 244/137.4 |
| 3,954,233 A | * | 5/1976 | Hasquenoph | B64D 7/08 244/137.4 |
| 3,982,466 A | * | 9/1976 | Baker | B64D 7/08 294/82.26 |
| 3,983,785 A | * | 10/1976 | Dissmeyer | F41F 3/052 89/1.819 |
| 4,008,645 A | * | 2/1977 | Herbert | B64D 7/08 89/1.51 |
| 4,050,656 A | * | 9/1977 | Peterson | B64D 1/06 89/1.53 |
| 4,056,248 A | * | 11/1977 | Hasquenoph | B64D 7/08 294/82.26 |
| 4,102,520 A | * | 7/1978 | Hasquenoph | B64D 1/06 294/82.26 |
| 4,120,232 A | * | 10/1978 | Hoffman, Jr. | B64D 1/06 294/82.26 |
| 4,129,271 A | * | 12/1978 | Hasquenoph | B64D 7/08 294/82.26 |
| 4,183,480 A | * | 1/1980 | Jakubowski, Jr. | B64D 1/02 89/1.53 |
| 4,313,582 A | * | 2/1982 | Hasquenoph | B64D 7/08 244/137.4 |
| 4,336,740 A | * | 6/1982 | Leigh | F41F 3/052 89/1.816 |
| 4,347,777 A | * | 9/1982 | Jakubowski, Jr. | B64D 7/08 244/137.4 |
| 4,416,437 A | * | 11/1983 | Hasquenoph | B64D 7/08 294/82.26 |
| 4,870,885 A | * | 10/1989 | Grosselin | B64D 7/08 89/1.819 |
| 4,922,799 A | * | 5/1990 | Bartl | B64D 1/06 89/1.819 |
| 4,926,740 A | * | 5/1990 | Griffin | B64D 7/08 89/1.819 |
| 5,291,820 A | * | 3/1994 | Hainsworth | F41F 3/052 89/1.819 |
| 5,889,226 A | * | 3/1999 | Giesenberg | F41F 3/052 89/1.806 |
| 5,907,118 A | * | 5/1999 | Jakubowski, Jr. | B64D 1/06 89/1.51 |
| 6,035,759 A | * | 3/2000 | Jakubowski, Jr. | B64D 7/08 89/1.51 |
| 7,083,148 B2 | * | 8/2006 | Bajuyo | B64D 1/04 244/137.4 |
| 8,127,655 B1 | * | 3/2012 | Kay | B64D 1/06 89/1.54 |
| 9,308,994 B2 | * | 4/2016 | Uskert | B64D 9/00 |
| 2007/0175323 A1 | | 8/2007 | Kim et al. | |
| 2011/0265637 A1 | | 11/2011 | Hainze et al. | |
| 2015/0239559 A1 | * | 8/2015 | Uskert | E05C 1/14 244/137.4 |
| 2023/0322384 A1 | * | 10/2023 | Hamelin | B64D 1/02 89/1.51 |

\* cited by examiner

DUAL DETENT APPARATUS FOR ROCKET

CROSS-REFERENCE TO RELATED APPLICATIONS

This application claims the benefit of Korean Patent Application No. 10-2023-0102666 filed on Aug. 7, 2023, in the Korean Intellectual Property Office, the entire disclosure of which is incorporated herein by reference for all purposes.

BACKGROUND

1. Field of the Invention

One or more embodiments relate to a detent apparatus for a rocket, and more particularly, to a detent apparatus to prevent the unintentional separation of a rocket from a rocket launcher.

2. Description of the Related Art

A fixing detent apparatus applied to a rocket is being developed. This detent apparatus must stably fix a rocket before being launched to increase the survivability of an aerial platform. A mechanical safety device may be applied to the detent apparatus. Patent Registration No. KR 10-1995518 discloses a detent structure for mechanical fixation and a rocket having the same. The above description is information the inventor(s) acquired during the course of conceiving the present disclosure, or already possessed at the time, and is not necessarily art publicly known before the present application was filed.

SUMMARY

Embodiments provide a dual detent apparatus for a rocket that fixes the rocket stably, wherein the dual detent apparatus includes both a mechanical safety device and an electrical safety device.

According to an aspect, there is provided a detent apparatus for a rocket, the detent apparatus including a detent, the detent including a first end portion, a second end portion opposite to the first end portion, an extension extending between the first end portion and the second end portion, and a detent protrusion configured to engage with the rocket and protruding from the second end portion, wherein extension has a detent rotation axis and the detent is configured to rotate around the detent rotation axis. a first elastic body configured to elastically support the first end portion of the detent and connected to the first end portion of the detent, and an electrical safety device configured to prevent rotation of the detent, the electrical safety device including a hinge fixing frame having a hinge axis parallel to the detent rotation axis, a detent support configured to rotate around the hinge axis and support the detent, a hinge axis shaft arranged on the hinge axis and connected to the hinge fixing frame, a solenoid configured to rotate the detent support by pushing the detent support, and a micro switch activated when the detent support rotates.

A center of gravity of the detent support may be positioned on the hinge axis.

The electrical safety device may further include a second elastic body configured to rotate around the hinge axis and connected to the detent support.

The electrical safety device may further include a diode and a resistor.

The detent may further include a detent shaft arranged on the detent rotation axis.

The detent apparatus may further include a detent holder connected to the detent shaft.

The detent rotation axis may be closer to the second end portion than to the first end portion.

The electrical safety device may further include a hinge arm connected to the hinge axis shaft and a driving switch activating the micro switch. The hinge arm may be disposed to press the driving switch when the detent support rotates.

The detent apparatus may further include a fixing block configured to fix the electrical safety device.

The detent apparatus may further include a base on which the rocket is disposed. The fixing block may be connected to the base.

Additional aspects of embodiments will be set forth in part in the description which follows and, in part, will be apparent from the description, or may be learned by practice of the disclosure.

According to embodiments, a detent apparatus may prevent the unintentional separation of a rocket by applying mechanical and electrical fixing methods to the rocket. The effects of the detent apparatus are not limited to the above-described effects, and other unmentioned effects may be clearly understood from the following description by one of ordinary skill in the art.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Hereinafter, embodiments will be described in detail with reference to the accompanying drawings. However, various alterations and modifications may be made to the examples. Here, the examples are not construed as limited to the disclosure. The examples should be understood to include all changes, equivalents, and replacements within the idea and the technical scope of the disclosure.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the embodiments described above and an element having a common function. Unless otherwise mentioned, the descriptions on the embodiments may be applicable to the following embodiments and thus, duplicated descriptions will be omitted for conciseness.

Figure 1:
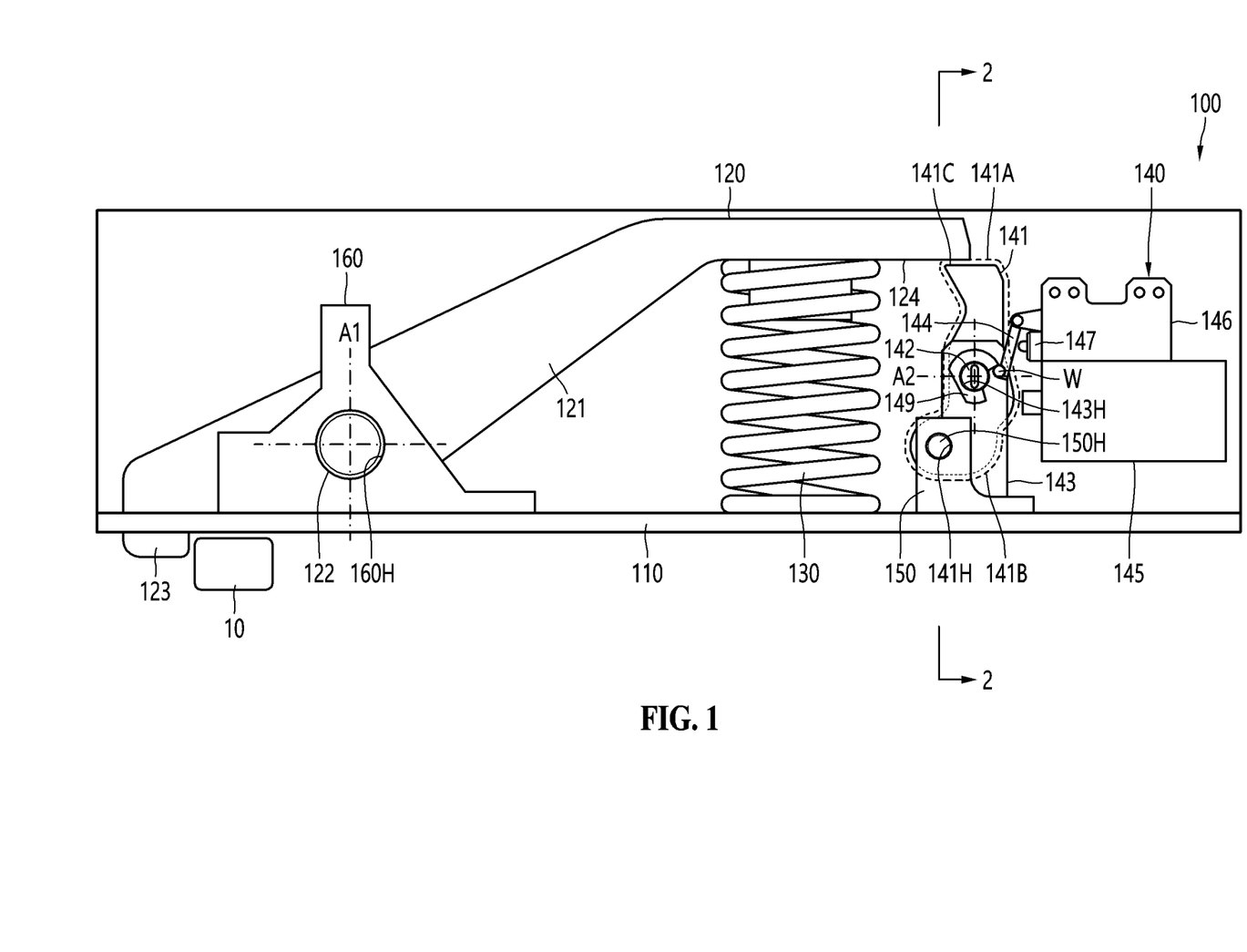
FIG. 1 is a diagram illustrating a detent apparatus according to an embodiment.
Figure 2:
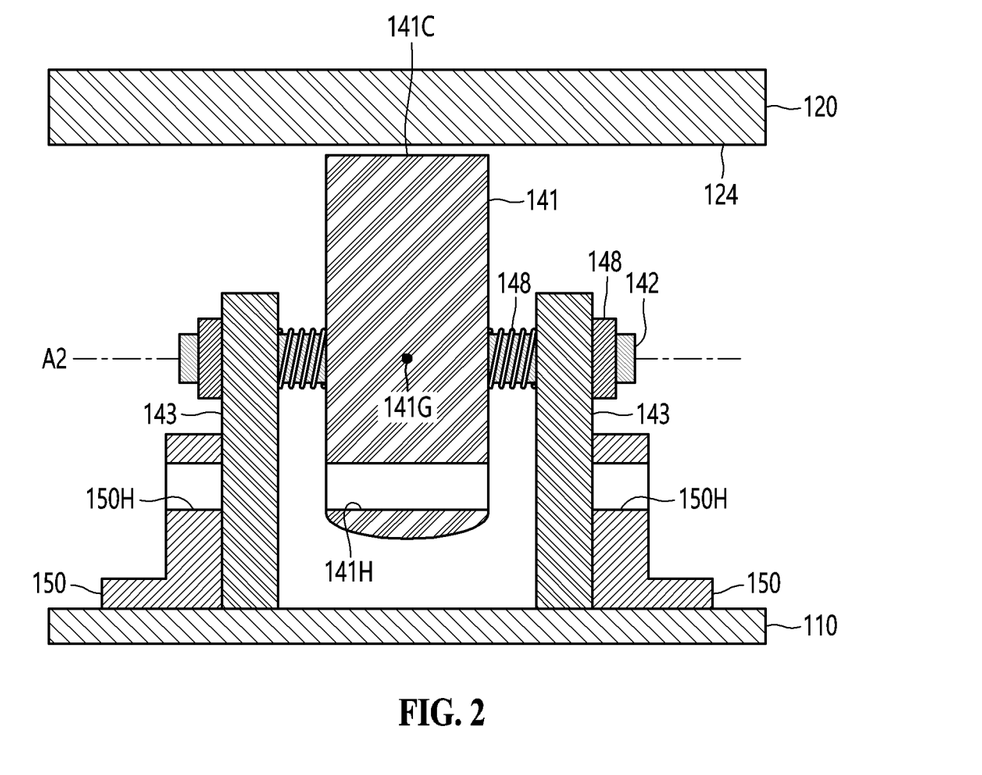
FIG. 2 is a cross-sectional view illustrating the detent apparatus, taken along a line 2-2 according to an embodiment.

FIG. 1 is a diagram illustrating a detent apparatus according to an embodiment. FIG. 2 is a cross-sectional view illustrating the detent apparatus, taken along a line 2-2 according to an embodiment.

Referring to FIGS. 1 and 2, a detent apparatus 100 may include a base 110. Other structures (e.g., a first elastic body 130) of the detent apparatus 100 may be connected to the base 110. The base 110 may be removably connected to a rocket 10. The base 110 may be relatively fixed to the rocket 10 while the detent apparatus 100 is operating (e.g., while a detent 120 rotates around a detent rotation axis A1). The base 110 may be disposed on one side (e.g., the lower side of the detent apparatus 100 in FIG. 1) of the detent apparatus 100. The base 110 may be disposed in a partial area of one side of the detent apparatus 100. The width (e.g., the length in right and left directions of the base 110 in FIG. 2) of the base 110 may be substantially the same as the width of the detent apparatus 100. In an embodiment not shown in the drawing, the width of the base 110 may be less than that of the detent apparatus 100.

The detent apparatus 100 may include the detent 120. The detent 120 may prevent the launch of the rocket 10. The detent 120 may contact one structure (e.g., a hanger) of the rocket 10. The detent 120 may support one structure of the rocket 10. For example, if the rocket 10 receives a thrust in the direction of progress (e.g., the left direction in FIG. 1) when a user does not intend to launch the rocket 10, one structure (e.g., a detent protrusion 123 in FIG. 1) of the detent 120 in the direction of progress may support one structure (e.g., a hanger) of the rocket 10 and prevent the launch of the rocket 10 in the direction of progress. When the rocket 10 receives a sufficient thrust (e.g., the force required to rotate the detent 120 so that the detent protrusion 123 does not support the rocket 10 in a direction opposite to the direction of progress) in the direction of progress (e.g., the left direction in FIG. 1) and pushes the detent 120, the detent 120 may no longer prevent the launch of the rocket 10.

The detent 120 may include a first end portion (e.g., a portion adjacent to a right end portion of the detent apparatus 100 in FIG. 1). The detent 120 may include a second end portion (e.g., a portion adjacent to a left end portion of the detent apparatus 100 in FIG. 1) opposite to the first end portion. The detent 120 may include an extension 121 extending between the first end portion and the second end portion.

The extension 121 may have the detent rotation axis A1. The detent 120 may rotate around the detent rotation axis A1. The detent rotation axis A1 may be closer to the second end portion than to the first end portion. When the detent rotation axis A1 is closer to the second end portion than to the first end portion, the rocket 10 may rotate the detent 120 and be launched only when a relatively stronger thrust is received.

The extension 121 may include a detent shaft 122. The detent shaft 122 may be arranged on the detent rotation axis A1. The detent shaft 122 may rotate around the detent rotation axis A1. The detent shaft 122 may be fixed to the detent rotation axis A1. The extension 121 may rotate around the detent shaft 122. The width of the detent shaft 122 may be substantially the same as that of the extension 121. The width of the detent shaft 122 may be greater than that of the extension 121.

The detent 120 may include the detent protrusion 123. The detent protrusion 123 may contact the rocket 10. The detent protrusion 123 may engage with the rocket 10. The detent protrusion 123 may support the rocket 10. In addition to the fact that the detent protrusion 123 contacts a portion (e.g., a hanger) of the rocket 10 and supports the contacted portion of the rocket 10, the fact that the detent protrusion 123 supports the rocket 10 may include, as shown in FIG. 1, even when the rocket 10 is spaced apart from the contacted portion of the detent protrusion 123 with a gap, the fact that the contacted portion is supported by the detent protrusion 123 while contacting the detent protrusion 123 when the rocket 10 receives a thrust and moves in the direction of progress (e.g., the left direction in FIG. 1) of the rocket 10.

The detent protrusion 123 may penetrate the base 110. The detent protrusion 123 may extend from one side (e.g., the upper side of the base 110 in FIG. 1) of the base 110 to the other side (e.g., the lower side of the base 110 in FIG. 1) of the base 110 opposite to the one side at the second end portion of the detent 120. In an embodiment not shown in the drawing, instead of the detent protrusion 123 penetrating the base 110, the detent protrusion 123 may extend from one end portion (e.g., the left end portion of the base 110 in FIG. 1) of the base 110 in a direction perpendicular (e.g., the up and down direction in FIG. 1) to the one end portion of the base 110. The width of the detent protrusion 123 may be substantially the same as that of the base 110. The width of the detent protrusion 123 may be less than that of the base 110.

The detent 120 may include a first end lower surface 124 at the first end portion of the detent 120. The first end lower surface 124 may be substantially parallel to the base 110.

The first end lower surface 124 may include a portion protruding in one direction (e.g., the downward direction in FIG. 1). The first end lower surface 124 may be supported by other components (e.g., the first elastic body 130 or a detent support 141 in FIG. 1) of the detent apparatus 100.

The detent apparatus 100 may include a mechanical safety device. The mechanical safety device may include the first elastic body 130. The first elastic body 130 may elastically deform. The first elastic body 130 may reduce or prevent rotation of the detent 120. For example, the first elastic body 130 may be compressed as the detent 120 rotates around the detent rotation axis A1. The first elastic body 130 may prevent the rocket 10 from separating from the detent apparatus 100 when the rocket 10 receives force less than a sufficient thrust required for the launch of the rocket 10 (e.g., the force required to rotate the detent 120 so that the detent protrusion 123 does not support the rocket 10 in a direction opposite to the direction of progress). For example, when the rocket 10 applies force to move in the direction of progress to the detent protrusion 123 and tries to rotate the detent 120, the first elastic body 130 may apply force to the detent 120 in a direction opposite to the force to be rotated and reduce an angle at which the detent 120 rotates. Even when the detent 120 rotates slightly, when the detent protrusion 123 continues to support the rocket 10 in a direction opposite to the direction of progress, the rocket 10 may not be launched. When the rocket 10 receives a sufficient thrust and the detent 120 rotates enough such that the detent protrusion 123 does not support the rocket 10 in a direction opposite to the direction of progress, the rocket 10 may be launched.

The first elastic body 130 may include a compression spring. The user may appropriately select a spring constant of the compression spring in the first elastic body 130 according to a sufficient thrust to be received for the rocket 10 to be launched. In an embodiment not shown in the drawing, the first elastic body 130 may include a torsion beam. The first elastic body 130 may be connected to the first end lower surface 124. The first elastic body 130 may be connected to a portion protruding from the first end lower surface 124. One end portion of the first elastic body 130 may support the first end lower surface 124. The first elastic body 130 may be connected to the base 110. The other end portion opposite to the one end portion of the first elastic body 130 may be supported by the base 110. The first elastic body 130 may connect between the first end lower surface 124 and the base 110.

The detent apparatus 100 may include an electrical safety device 140. The detent apparatus 100 may include both the mechanical safety device and the electrical safety device 140. The electrical safety device 140 may prevent the launch of the rocket 10 when the user does not intend the rocket 10 to be launched. The electrical safety device 140 may prevent the launch of the rocket 10 in an activated state and may not prevent the launch of the rocket in a deactivated state. For example, in a detent apparatus having only a mechanical safety device, even when the detent 120 rotates and force enough to prevent the detent protrusion 123 from supporting the rocket 10 is applied to the detent 120, the detent apparatus 100 including the electrical safety device 140 may prevent the rotation of the detent 120. The electrical safety device 140 may be connected to the base 110. An area where the electrical safety device 140 contacts the base 110 may be substantially the same or smaller than an area where the mechanical safety device (e.g., the first elastic body 130 in FIG. 1) contacts the base 110.

The electrical safety device 140 may include the detent support 141. The detent support 141 may support a portion (e.g., the first end portion of the detent 120) of the detent 120. The detent support 141 may support a portion of the detent 120 and prevent the detent 120 from rotating around the detent rotation axis A1. The width of the detent support 141 may be less than that of the detent 120. The width of the detent support 141 may be substantially the same as that of the detent 120. In an embodiment not shown in the drawing, the width of the detent support 141 may be greater than that of the detent 120. An area where the detent support 141 supports the first end lower surface 124 of the detent 120 may be substantially the same or smaller than an area where the first elastic body 130 supports the first end lower surface 124 of the detent 120.

The detent support 141 may include a detent support upper end portion 141A. The detent support 141 may include a detent support lower end portion 141B. The detent support 141 may include a detent support upper end surface 141C. The detent support 141 may include a detent support hole 141H penetrating the detent support 141 in the width direction. In an embodiment not shown in the drawing, the detent support 141 may not include the detent support hole 141H.

In addition to the fact that the detent support 141 contacts a portion of the detent 120 and supports the contacted portion, the fact that the detent support 141 supports the detent 120 may include, as shown. even when the detent support 141 is spaced apart from the contacted portion of the detent 120 with a gap, the fact that the contacted portion is supported by the detent support 141 while the detent 120 rotates around the detent rotation axis A1 and a portion (e.g., the first end lower surface 124) of the detent 120 contacts a portion (e.g., the detent support upper end surface 141C) of the detent support 141.

The detent support 141 may rotate around one axis (e.g., a hinge axis A2 in FIG. 1). The detent support 141 may be configured such that the center of gravity 141G of the detent support 141 is positioned on the one axis. The position of the center of gravity 141G of the detent support 141 may reduce or prevent the rotation of the detent support 141 when force is not applied to the detent support upper end portion 141A or the detent support lower end portion 141B.

The electrical safety device 140 may include at least one hinge fixing frame 143. The hinge fixing frame 143 may be connected to the detent support 141. The hinge fixing frame 143 may include the hinge axis A2 parallel to the detent rotation axis A1. The hinge fixing frame 143 may include a hinge fixing frame hole 143H on the hinge axis A2. The hinge fixing frame hole 143H may penetrate the hinge fixing frame 143. The hinge fixing frame 143 may be fixed to the base 110. Two hinge fixing frames 143 may be disposed at both end portions of the base 110 in the width direction of the base 110, respectively.

The electrical safety device 140 may include a hinge axis shaft 142 arranged on the hinge axis A2. The hinge axis shaft 142 may be connected to the hinge fixing frame hole 143H. The hinge axis shaft 142 may be connected to be fixed to the detent support 141. As the detent support 141 rotates around the hinge axis A2, the hinge axis shaft 142 may rotate. As the hinge axis shaft 142 rotates, the detent support 141 may rotate. The hinge axis shaft 142 may connect two hinge fixing frames 143 respectively disposed at both end portions of the base 110 in the width direction of base 110. The hinge axis shaft 142 may be connected to one hinge fixing frame 143 and substantially parallel to the base 110.

The electrical safety device 140 may include a hinge arm 144. The hinge arm 144 may be connected to the hinge axis shaft 142. As the hinge axis shaft 142 rotates around the hinge axis A2, the hinge arm 144 may move. The hinge arm 144 may include at least one link. The hinge arm 144 may include a joint.

The hinge arm 144 may include a wheel W. The wheel W may be included at an end portion of the hinge arm 144 facing the hinge axis shaft 142. The position of the center of the wheel W may be relatively fixed to the hinge arm 144. The wheel W may rotate. The wheel W may slidably contact other elements (e.g., a shaft end cover 149) of the detent apparatus 100. The diameter of the wheel W may be substantially the same as the thickness of the hinge arm 144. The diameter of the wheel W may be less than the thickness of the hinge arm 144.

The electrical safety device 140 may include a solenoid 145. The solenoid 145 may deactivate the electrical safety device 140. The user may deactivate the electrical safety device 140 using the solenoid 145 and launch the rocket 10. For example, as shown in FIG. 1, the detent support 141 may be arranged when the electrical safety device 140 is activated. When the electrical safety device 140 is deactivated, only the mechanical safety device (e.g., the first elastic body 130 in FIG. 1) may reduce or prevent the rotation of the detent 120, and here, when the rocket 10 receives a sufficient thrust, the rocket 10 may push the detent protrusion 123 and be launched. The solenoid 145 may be fixed to one element (e.g., the base 110) of the detent apparatus 100. The solenoid 145 may be disposed on the base 110 of the detent 120.

The solenoid 145 may push one side of the detent support lower end portion 141B, which is the lower end portion of the detent support 141, in one direction (e.g., from right to left directions in FIG. 1). When the detent support lower end portion 141B is pushed, the detent support 141 may rotate in one direction (e.g., clockwise in FIG. 1) around the hinge axis A2. As the detent support 141 rotates in one direction, the detent support upper end surface 141C may not support the first end lower surface 124 of the detent 120. When the detent support upper end surface 141C does not support the first end lower surface 124, the electrical safety device 140 may be deactivated.

The electrical safety device 140 may include a micro switch 146. The micro switch 146 may include a driving switch 147 that activates or deactivates the micro switch 146. When the micro switch 146 is activated, a mechanical or an electrical signal may be transmitted to the user. For example, the micro switch 146 may include a light source, and when the driving switch 147 is pressed and the micro switch 146 is activated, the micro switch 146 may emit light from the light source and the user may see the emitted light and recognize that the micro switch 146 is activated.

The micro switch 146 may be fixed to one element (e.g., the solenoid 145) of the detent apparatus 100. The hinge arm 144 may be connected to the micro switch 146.

The micro switch 146 may be activated as the electrical safety device 140 is deactivated. For example, when the solenoid 145 rotates the detent support 141 around the hinge axis A2 and the electrical safety device 140 is deactivated, the hinge arm 144 is moved due to the rotation of the hinge axis shaft 142 so that the driving switch 147 may be pressed. The user may see a signal transmitted by the micro switch 146, which is activated by pressing the driving switch 147, and recognize that the electrical safety device 140 is deactivated.

The electrical safety device 140 may include a second elastic body 148. When the detent support 141 rotates around the hinge axis A2 in one direction, the second elastic body 148 may apply force in another direction opposite to the one direction. The second elastic body 148 may be disposed on the hinge axis A2. The second elastic body 148 may be connected to the hinge axis shaft 142. The second elastic body 148 may be connected to the detent support 141. The second elastic body 148 may include a torsion spring.

The electrical safety device 140 may include a shaft end cover 149. The shaft end cover 149 may be connected to one end portion of the hinge axis shaft 142. The shaft end cover 149 may face at least a portion of a side surface of the hinge axis shaft 142. The shaft end cover 149 may be fixed to the hinge axis shaft 142. The shaft end cover 149 may rotate as the hinge axis shaft 142 rotates.

The shaft end cover 149 may include a side surface extending in the radial direction. The side surface of the shaft end cover 149 may include a curved surface. An outer surface of the shaft end cover 149 may be curved. The side surface of the shaft end cover 149 may face at least a portion of the wheel W. The wheel W may be slidably connected to the shaft end cover 149. As the shaft end cover 149 rotates, the wheel W may slide on the side surface of the shaft end cover 149. The electrical safety device 140 may include a diode. The electrical safety device 140 may include a resistor. The diode and resistor may not be affected by reverse voltage while the solenoid 145 is operating. The diode and resistor may configure a protection circuit. The protection circuit may operate when overvoltage or reverse voltage is applied to the solenoid 145 and prevent the electrical safety device 140 from being deactivated as not intended by the user.

The detent apparatus 100 may include at least one fixing block 150. The fixing block 150 may be fixed to the base 110. The fixing block 150 may be connected to the hinge fixing frame 143. The fixing block 150 may fix the hinge fixing frame 143. The fixing block 150 may prevent the hinge fixing frame 143 from moving while the solenoid 145 pushes one side of the detent support lower end portion 141B in one direction (e.g., from right to left directions in FIG. 1) and the detent support 141 rotates. The fixing block 150 may be disposed on both sides of the hinge fixing frame 143.

The fixing block 150 may include a fixing block hole 150H. While the electrical safety device 140 is activated, the fixing block hole 150H may be positioned coaxially with the detent support hole 141H. For example, while the electrical safety device 140 is activated, to prevent the detent support 141 from rotating as not intended by the user, the user may arrange and fix the fixing block hole 150H and the detent support hole 141H coaxially. The fixing block 150 may include a mechanical structure (e.g., an L-shaped ball lock pin) (not shown). The mechanical structure may simultaneously penetrate the fixing block hole 150H and the detent support hole 141H that are coaxially arranged. The mechanical structure may be removably connected to the fixing block hole 150H and the detent support hole 141H. While the mechanical structure is connected to the fixing block hole 150H and the detent support hole 141H, the detent support 141 may be fixed without rotating. The diameter of the fixing block hole 150H may be substantially the same as that of the detent support hole 141H.

The detent apparatus 100 may include a detent holder 160. The detent holder 160 may prevent a relative position of the detent rotation axis A1 in the detent apparatus 100 from changing while the detent 120 rotates around the detent rotation axis A1. The detent holder 160 may be fixed to the base 110. The detent holder 160 may be connected to the detent 120. The detent 120 may be rotatably connected to the detent holder 160. The detent holder 160 may include a detent holder hole 160H disposed in the detent rotation axis A1. The detent shaft 122 may be connected to the detent holder hole 160H. The detent shaft 122 may be rotatably connected to the detent holder 160. The diameter of the detent holder hole 160H may be substantially the same as that of the detent shaft 122.

Figure 3:
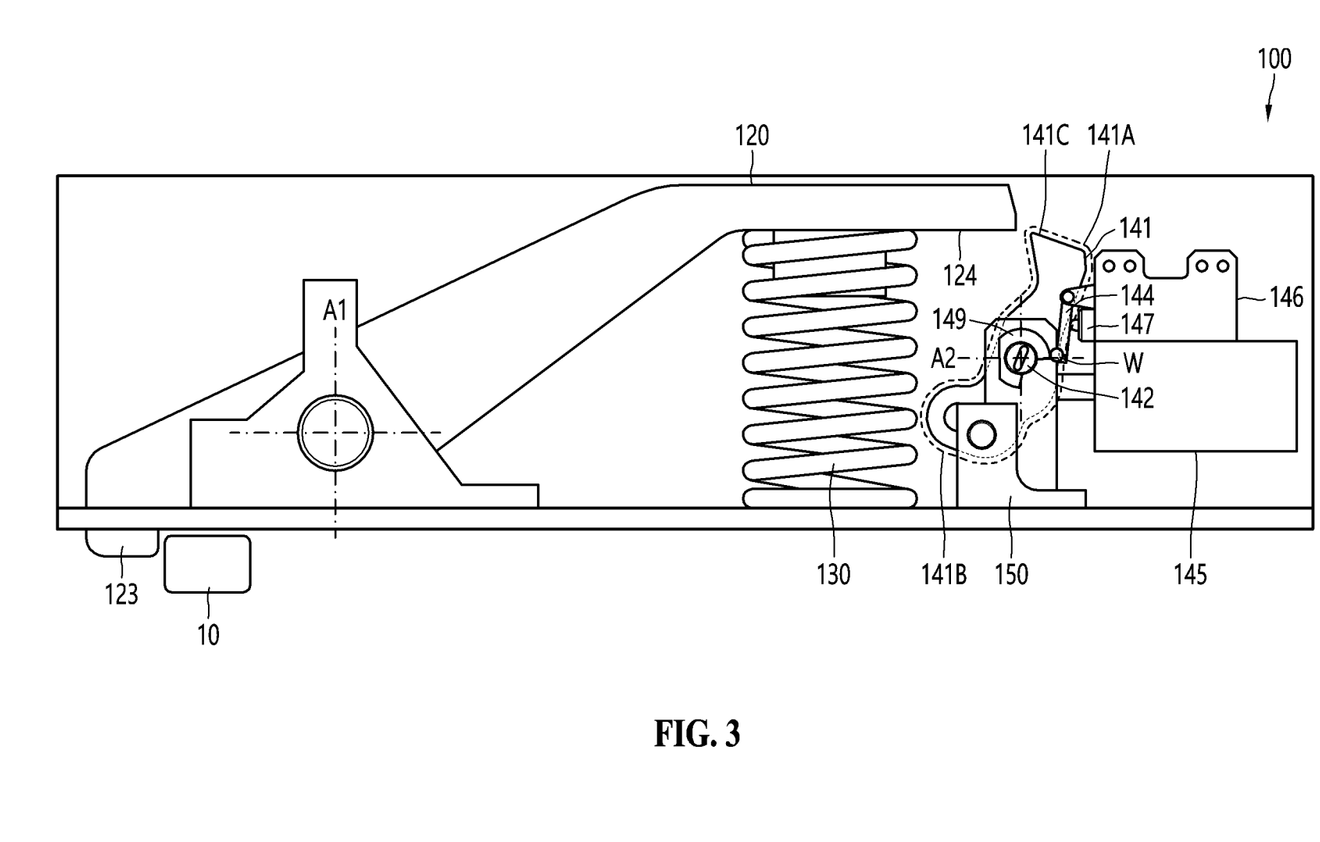
FIG. 3 is a diagram illustrating a state in which an electrical safety device is deactivated during the launch of a rocket to which a detent apparatus is applied, according to an embodiment.
Figure 4:
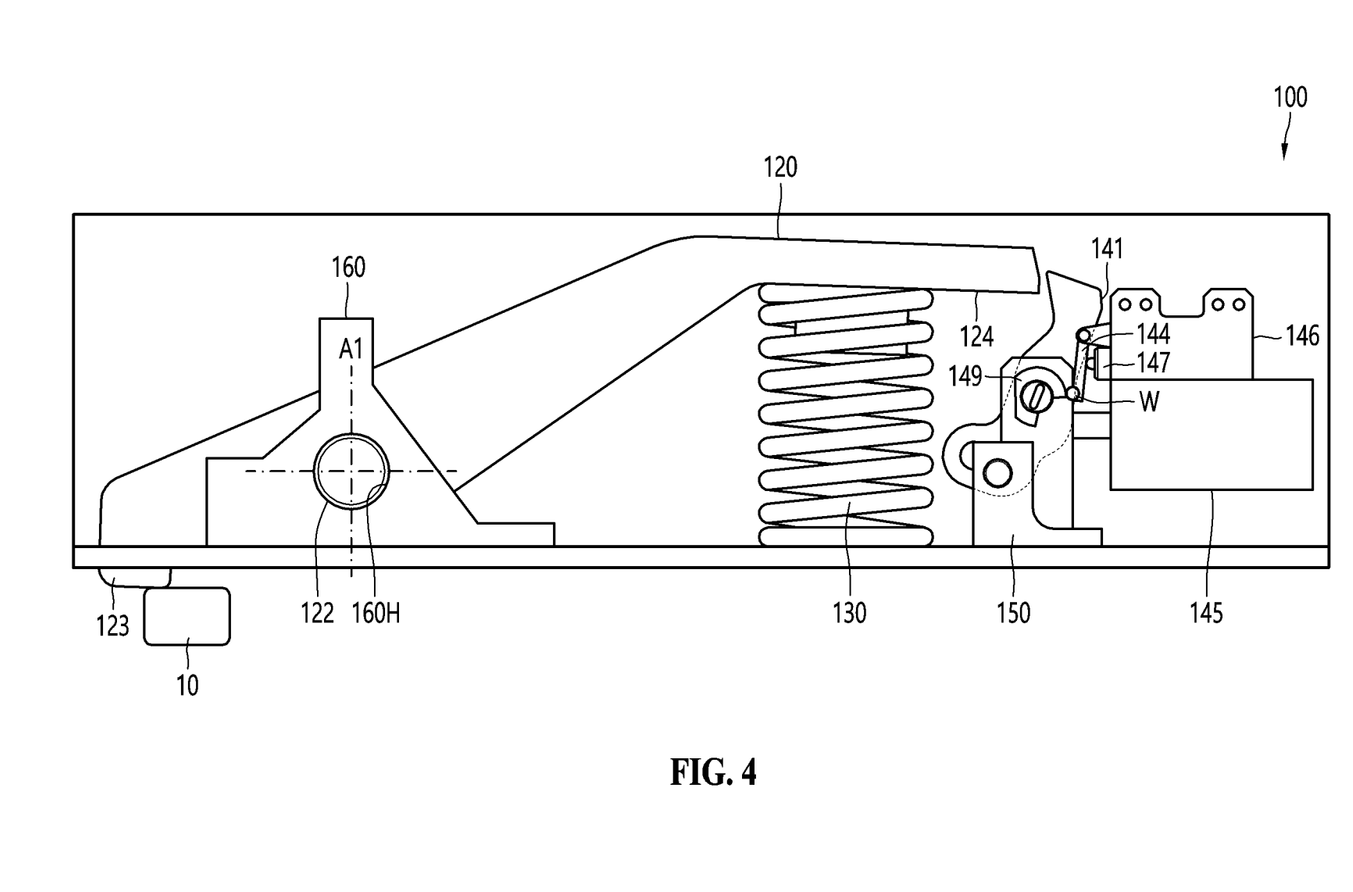
FIG. 4 is a diagram illustrating a state in which a rocket pushes a detent during the launch of the rocket to which a detent apparatus is applied, according to an embodiment.
Figure 5:
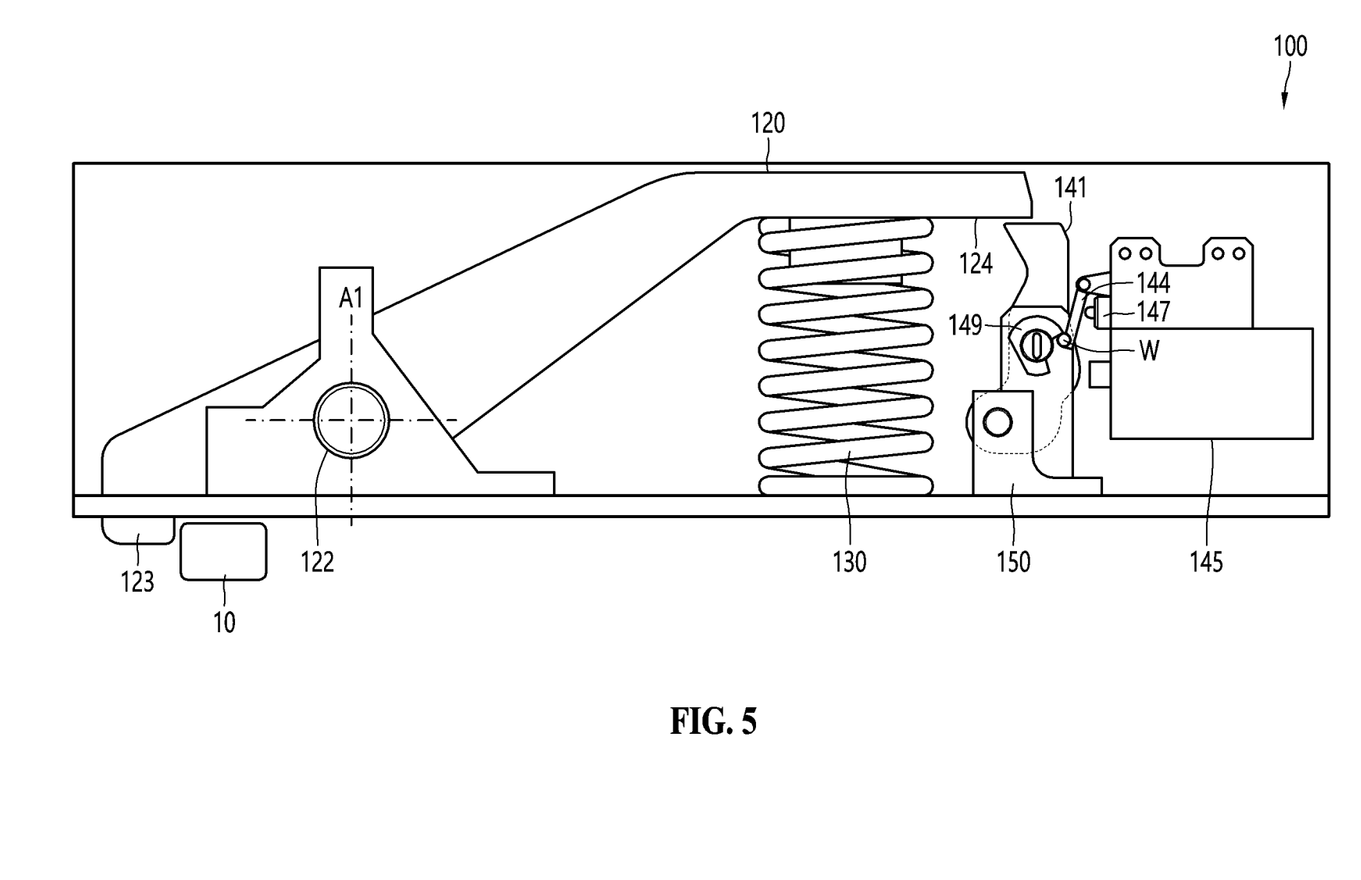
FIG. 5 is a diagram illustrating a detent apparatus returned to the original position thereof after a rocket to which the detent apparatus is applied is launched, according to an embodiment.

FIG. 3 is a diagram illustrating a state in which an electrical safety device is deactivated during the launch of a rocket to which a detent apparatus is applied, according to an embodiment. FIG. 4 is a diagram illustrating a state in which a rocket pushes a detent during the launch of the rocket to which a detent apparatus is applied, according to an embodiment. FIG. 5 is a diagram illustrating a detent apparatus returned to the original position thereof after a rocket to which the detent apparatus is applied is launched, according to an embodiment.

Referring to FIGS. 3 to 5, a process in which the electrical safety device 140 is deactivated and the rocket 10 is launched may be understood. When power is supplied to the solenoid 145, the solenoid 145 may push one side of the detent support lower end portion 141B in one direction (e.g., from right to left in FIG. 1) and rotate the detent support 141 around the hinge axis A2 in one direction (e.g., clockwise in FIG. 3). After the detent support 141 rotates, the detent support upper end surface 141C may not support the first end lower surface 124 of the detent 120. When the detent support 141 rotates, the hinge axis shaft 142 may also rotate and the hinge arm 144 may also move. The hinge arm 144 may activate the micro switch 146 by pressing the driving switch 147. For example, when the hinge axis shaft 142 rotates in one direction (e.g., clockwise in FIG. 3), the shaft end cover 149 may also rotate in the same direction as the one direction. When the shaft end cover 149 rotates, the wheel W may slide on the side surface of the shaft end cover 149. The wheel W may slide on the side surface of the shaft end cover 149 and no longer contact the side surface of the shaft end cover 149. After the shaft end cover 149 rotates, the wheel W may contact the outer surface of the shaft end cover 149. The wheel W may slidably contact the outer surface of the shaft end cover 149. When the wheel W no longer contacts the side surface of the shaft end cover 149 and contacts the outer surface of the shaft end cover 149, the hinge arm 144 is moved so that the driving switch 147 is pressed. The user may recognize that the electrical safety device 140 is deactivated from a signal transmitted by the micro switch 146 that is activated.

The user may cause the rocket 10 to be thrusted to launch the rocket 10. When the rocket 10 receives a sufficient thrust to be launched, the rocket 10 may push the detent protrusion 123, compress the first elastic body 130, and be launched while rotating the detent 120 around the detent rotation axis A1.

After the rocket 10 is launched, the first elastic body 130 and the detent 120 may return to a position before the rocket 10 is launched by the elasticity of the first elastic body 130. The solenoid 145 may return to a position before the rocket 10 is launched when power supply to the solenoid 145 is blocked after the rocket 10 is launched. Due to the elasticity of a second elastic body (not shown), the detent support 141 may return to a position before the detent support lower end portion 141B is pushed by the solenoid 145. When the detent support 141 returns to a position (e.g., the position in FIG. 5) before being rotated by the solenoid 145, the wheel W may slide from the outer surface of the shaft end cover 149 to the side surface of the shaft end cover 149. When the hinge arm 144 returns to a position of the hinge arm 144 before the detent support 141 is pushed by the solenoid 145 according to the movement of the wheel W, the hinge arm 144 may no longer press the driving switch 147. When the micro switch 146 is inactivated as the driving switch 147 is not pressed, it may be recognized that the electrical safety device 140 is activated from a signal transmitted by the micro switch 146.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. For example, suitable results may be achieved if the described techniques are performed in a different order and/or if components in a described system, architecture, device, or circuit are combined in a different manner and/or replaced or supplemented by other components or their equivalents.

Therefore, other implementations, other embodiments, and/or equivalents of the claims are within the scope of the following claims.

What is claimed is:

1. A detent apparatus for a rocket, the detent apparatus comprising:
 a detent, the detent comprising: a first end portion; a second end portion opposite to the first end portion comprising a detent protrusion extending through a base of the detent apparatus and configured to engage with the rocket; and an extension extending between the first end portion and the second end portion, wherein the extension has a detent rotation axis that is positioned closer to the second end portion than to the first end portion, and the detent is configured to rotate around the detent rotation axis;
 a first elastic body configured to elastically support the first end portion of the detent and connected to the first end portion of the detent such that the detent protrusion is elastically biased past a back side of the base and movement of the detent protrusion away from the rocket is elastically resisted; and
 an electrical safety device configured to prevent rotation of the detent, the electrical safety device comprising: a hinge fixing frame having a hinge axis parallel to the detent rotation axis; a detent support configured to rotate around the hinge axis and support the detent; a hinge axis shaft arranged on the hinge axis and connected to the hinge fixing frame; a solenoid configured to rotate the detent support by pushing the detent support; and a micro switch activated when the detent support rotates.

2. The detent apparatus of claim 1, wherein a center of gravity of the detent support is positioned on the hinge axis.

3. The detent apparatus of claim 1, wherein the electrical safety device further comprises a second elastic body configured to rotate around the hinge axis and connected to the detent support.

4. The detent apparatus of claim 1, wherein the electrical safety device further comprises a diode and a resistor.

5. The detent apparatus of claim 1, wherein the detent further comprises a detent shaft arranged on the detent rotation axis.

6. The detent apparatus of claim 5, further comprising:
 a detent holder connected to the detent shaft.

7. The detent apparatus of claim 1, wherein the detent rotation axis is closer to the second end portion than to the first end portion.

8. A detent apparatus for a rocket, the detent apparatus comprising:
- a detent, the detent comprising: a first end portion; a second end portion opposite to the first end portion; an extension extending between the first end portion and the second end portion; and a detent protrusion configured to engage with the rocket and protruding from the second end portion, wherein the extension has a detent rotation axis and the detent is configured to rotate around the detent rotation axis;
- a first elastic body configured to elastically support the first end portion of the detent and connected to the first end portion of the detent; and
- an electrical safety device configured to prevent rotation of the detent, the electrical safety device comprising: a hinge fixing frame having a hinge axis parallel to the detent rotation axis; a detent support configured to rotate around the hinge axis and support the detent; a hinge axis shaft arranged on the hinge axis and connected to the hinge fixing frame; a solenoid configured to rotate the detent support by pushing the detent support; and a micro switch activated when the detent support rotates,
- wherein the electrical safety device further comprises a hinge arm connected to the hinge axis shaft and a driving switch activating the micro switch, and
- wherein the hinge arm is disposed to press the driving switch when the detent support rotates.

9. The detent apparatus of claim 1, further comprising:
- a fixing block configured to fix the electrical safety device.

10. The detent apparatus of claim 9, further comprising:
- a base on which the rocket is disposed,
- wherein the fixing block is connected to the base.

11. The detent apparatus of claim 1, wherein the electrical safety device further comprises a hinge arm connected to the hinge axis shaft and configured to activate the micro switch when the detent support rotates.

12. The detent apparatus of claim 1, wherein the first elastic body elastically biases the detent about the detent rotation axis in a direction such that the detent protrusion is elastically biased into engagement with the rocket.

13. The detent apparatus of claim 1, wherein the detent protrusion is configured to engage with a portion of the rocket, and the first elastic body elastically supports the first end portion of the detent and is connected to the first end portion of the detent such that disengagement of the detent protrusion from the portion of the rocket is elastically resisted.

14. The detent apparatus of claim 1, wherein the first elastic body elastically biases the detent about the detent rotation axis in a direction such that movement of the detent protrusion toward the back side of the base is elastically resisted.

15. The detent apparatus of claim 1, wherein a first portion of the detent support supports the first end portion of the detent, the solenoid is configured to push a second portion of the detent support, and the hinge axis is positioned between the first and second portions of the detent support.

16. The detent apparatus of claim 8, wherein the first elastic body elastically resists movement of the detent protrusion away from the rocket.

17. The detent apparatus of claim 16, wherein the detent rotation axis is positioned closer to the second end portion than to the first end portion.

18. The detent apparatus of claim 8, wherein the first elastic body elastically resists disengagement of the detent protrusion from the rocket.

19. The detent apparatus of claim 8, wherein a center of gravity of the detent support is positioned on the hinge axis.

20. The detent apparatus of claim 8, wherein the electrical safety device further comprises a second elastic body configured to rotate around the hinge axis and connected to the detent support.

* * * * *